(12) United States Patent
Henry et al.

(10) Patent No.: US 10,662,072 B2
(45) Date of Patent: May 26, 2020

(54) METHOD FOR PRODUCING CALCIUM SULFATE

(71) Applicant: PRAYON TECHNOLOGIES, Engis (BE)

(72) Inventors: Thomas Henry, Heers (BE); Tibaut Theys, Faux-les-Tombes (BE)

(73) Assignee: PRAYON TECHNOLOGIES, Engis (BE)

( * ) Notice: Subject to any disclaimer, the term of this patent is extended or adjusted under 35 U.S.C. 154(b) by 0 days.

(21) Appl. No.: 16/312,906

(22) PCT Filed: Jun. 22, 2017

(86) PCT No.: PCT/EP2017/065371
§ 371 (c)(1),
(2) Date: Dec. 21, 2018

(87) PCT Pub. No.: WO2017/220718
PCT Pub. Date: Dec. 28, 2017

(65) Prior Publication Data
US 2019/0322540 A1  Oct. 24, 2019

(30) Foreign Application Priority Data

Jun. 23, 2016 (BE) .................................. 2016/5463

(51) Int. Cl.
*C04B 11/26* (2006.01)
*C01F 11/46* (2006.01)
(Continued)

(52) U.S. Cl.
CPC .......... *C01F 11/466* (2013.01); *C01B 25/231* (2013.01); *C01B 25/324* (2013.01); *C04B 11/266* (2013.01); *C01P 2006/82* (2013.01)

(58) Field of Classification Search
CPC ....... C01B 25/02; C01B 25/16; C01B 25/163; C01B 25/22; C01B 25/222; C01B 25/229;
(Continued)

(56) References Cited

U.S. PATENT DOCUMENTS 2,013,970 A    9/1935  Moore
3,580,703 A *  5/1971  Pavonet ................ C01F 11/466
                                              423/170
(Continued)

FOREIGN PATENT DOCUMENTS

EP    0 169 842 A1   2/1986
WO    2010/043262 A1 4/2010
(Continued)

OTHER PUBLICATIONS

Written Opinion of the International Searching Authority dated Aug. 10, 2017, issued in corresponding International Application No. PCT/EP2017/065371, filed Jun. 22, 2017, 4 pages.
(Continued)

*Primary Examiner* — Timothy C Vanoy
(74) *Attorney, Agent, or Firm* — Christensen O'Connor Johnson Kindness PLLC

(57) ABSTRACT

A method for preparing calcium sulphate comprising a production of DCP by the attack of a source of phosphate by an acid, a digestion of the isolated DCP by the sulphuric acid under conditions giving rise to the formation of a first slurry of gypsum suspended in an acidic aqueous phase having a content of free $SO_3$ equal to or less than 1.5% and a content of free $P_2O_5$, a conversion of at least part of said first slurry by heating to a temperature greater than 80° C. and potentially by adding sulphuric acid, with solubilisation of the gypsum crystals and recrystallisation of the solubilised calcium sulphate in a second slurry of α-calcium sulphate hemihydrate crystals suspended in an aqueous phase based-
(Continued)

on phosphoric acid, wherein the content of free $SO_3$ is less than 10% by weight, and a separation between said aqueous phase and a filter cake based on particularly pure α-calcium sulphate hemihydrate.

15 Claims, 1 Drawing Sheet

(51) Int. Cl.
*C01B 25/231* (2006.01)
*C01B 25/32* (2006.01)

(58) Field of Classification Search
CPC ... C01B 25/231; C01B 25/2377; C01F 11/46; C01F 11/468
See application file for complete search history.

(56) References Cited

U.S. PATENT DOCUMENTS

| | | |
|---|---|---|
| 4,088,738 A | 5/1978 | Hauge |
| 4,524,057 A * | 6/1985 | Bigot .................. C01B 25/22 423/555 |
| 4,588,570 A | 5/1986 | Davister et al. |
| 6,620,395 B1 * | 9/2003 | Mantel .................. C01B 25/22 204/157.45 |
| 9,371,230 B2 | 6/2016 | Hoxha et al. |

FOREIGN PATENT DOCUMENTS

| | | |
|---|---|---|
| WO | 2012/163425 A1 | 12/2012 |
| WO | 2015/082468 A1 | 6/2015 |

OTHER PUBLICATIONS

International Preliminary Report on Patentability dated Dec. 25, 2018, issued in corresponding International Application No. PCT/EP2017/065371, filed Jun. 22, 2017, 1 page.

International Search Report dated Aug. 10, 2017, issued in corresponding International Application No. PCT/EP2017/065371, filed Jun. 22, 2017, 6 pages.

Written Opinion of the International Searching Authority dated Aug. 10, 2017, issued in corresponding International Application No. PCT/EP2017/065371, filed Jun. 22, 2017, 5 pages.

* cited by examiner

METHOD FOR PRODUCING CALCIUM SULFATE

This invention relates to methods for producing calcium sulphate.

For a long time, different known methods have been used to produce phosphoric acid by the wet process involving the attack of sulphuric acid on raw phosphate materials, such as phosphate ores and different phosphate rocks. These methods provide in abundance a by-product that is present in the form of calcium sulphate. Depending on the applied conditions during the method, the calcium sulphate is obtained, in a known manner, in the form of a dihydrate $CaSO_4.2H_2O$, also called gypsum, a hemihydrate $CaSO_4.\frac{1}{2}H_2O$ or even an anhydrite $CaSO_4$. These secondary products are generally poorly valorised or even not recoverable given their unsatisfactory quality.

In general, in production methods of phosphoric acid by so-called classical sulphuric acid attack, gypsum is obtained, alongside a phosphoric acid having a low-performance $P_2O_5$ extraction efficiency, said gypsum having a low degree of purity and in particular containing a still unacceptable quantity of $P_2O_5$ in the gypsum crystals for the use thereof by plasterers. On some production sites, this gypsum is purely and simply disposed of, in particular by landfill disposal.

When a filter cake based on calcium sulphate hemihydrate—is obtained at the end of the phosphoric acid production process, said filter cake is generally stockpiled for rehydration using the impregnation water thereof, or even directly repulped in an aqueous medium, thus transforming it into the calcium sulphate dihydrate form. This gypsum is then used in different low added value applications, for example in cements. Sometimes, it is dried under conditions designed to reproduce a hemihydrate, which makes this type of treatment particularly expensive. However, this calcium sulphate remains unsuitable for use in fields requiring a high degree of purity, for example for the manufacture of plasterboard, the molded products, etc.

In order to overcome this situation, numerous methods have been provided for purifying the calcium sulphate finally obtained, for example using a process for carefully washing the cake removed from the filter, in particular by leaching using sulphuric acid.

Methods are also known in the manufacture of phosphoric acid that firstly involve a step for treating the rock in order to extract a phosphate. These methods comprising:
  producing calcium monohydrogen phosphate (DCP or dicalcium phosphate) by
    attack in an aqueous medium of a source of phosphate by an acid with the formation of a pulp comprising an aqueous phase containing water-soluble calcium phosphate and a solid phase containing impurities,
    separation of the aqueous phase,
    neutralisation of the latter by a neutralising calcium compound with precipitation of said calcium monohydrogen phosphate in an aqueous solution, and
    isolation of the precipitated calcium monohydrogen phosphate from said aqueous solution, and
  digesting the isolated calcium monohydrogen phosphate in an aqueous medium by sulphuric acid under conditions giving rise to the formation of a slurry of calcium sulphate dihydrate crystals suspended in an acidic aqueous phase having a content of free $P_2O_5$ (see for example WO2010/043262, WO2015/082468, U.S. Pat. Nos. 2,013,970 and 4,088,738).

Document WO2010/043262 discloses a process for the production of high-purity phosphoric acid that is very complex. During one of its many steps, the calcium monohydrogen phosphate is attacked by a very strong concentration of sulphuric acid in the attack slurry and under conditions that produce a weak concentration of phosphoric acid at this stage, and the gypsum which is immediately discarded.

The method according to the patent application WO2015/082468 relates to the production of phosphates intended for agricultural or agri-food uses. It discloses a step for digesting the calcium monohydrogen phosphate, which results in the formation of calcium sulphate dihydrate. This is either directly produced during digestion, i.e. having an unsatisfactory content of $P_2O_5$ that is co-crystallised in the gypsum crystals, or it is produced from calcium sulphate hemihydrate, obtained during the digestion, which is immediately converted into gypsum. This conversion takes place by treating the hemihydrate with hydrochloric acid or potentially with sulphuric acid, which results in a high acid consumption and produces calcium sulphate having an undesirably high level of acidity. It is also known that the methods performed under conditions giving rise to hemihydrate production during the sulphuric acid attack have a low $P_2O_5$ extraction efficiency, which is less than those obtained by conventional sulphuric acid attack methods.

The method according to the U.S. Pat. No. 2,013,970 discloses a method for preparing phosphoric acid, as described hereinabove, having the drawbacks of an important $P_2O_5$ encapsulation in the gypsum crystals formed during the sulphuric acid attack, which makes it unsuitable for use by plasterers.

The method according to the U.S. Pat. No. 4,088,738 comprises a very complex attack of calcium monohydrogen phosphate by a very diluted mixture of phosphoric acid and sulphuric acid with repeated steps. In the liquid medium formed by this mixture, the previously prepared calcium monohydrogen phosphate is added in portions, a part of this mixture is then regularly withdrawn and filtered, and the phosphoric acid obtained is recycled in the liquid medium, while small portions of sulphuric acid are successively added to the mixture. These operations are repeated until a strong concentration of phosphoric acid is obtained. The filtered sediment is constituted from gypsum.

All of these methods according to the prior art allow for the production of gypsum at a given point in their process, said gypsum being a product that is less valued directly. Moreover, these four methods consume a significant quantity of acid, in particular sulphuric acid, which increases the industrial cost and results in corrosion concerns regarding the equipment used.

In fact, there is a need, for plasterers, for calcium sulphate that not only has a high degree of purity, but that also has qualities allowing it to be used in precise fields, such as for the production of plasterboard, plaster casting, or applications requiring a material with a high mechanical strength. The properties to be achieved are especially the compressive strength, the flexural strength as well as the duration of setting. For such applications, plasterers use a specific calcium sulphate: α-calcium sulphate hemihydrate.

The purpose of this invention is therefore to develop a method for producing α-calcium sulphate hemihydrate that has a high chemical purity and that can be immediately used by plasterers, in particular for the manufacture of products having a high degree of purity and good quality of setting and mechanical strength. It is required that obtaining such sulfate does not disadvantageously affect the joint production of phosphoric acid and in particular the $P_2O_5$ extraction efficiency during the attack of the phosphate material.

This issue has been resolved by providing a method for preparing calcium sulphate comprising:
producing calcium monohydrogen phosphate by:
attack in an aqueous medium of a source of phosphate by an acid with the formation of a pulp comprising an aqueous phase containing water-soluble calcium phosphate and a solid phase containing impurities,
separation of the aqueous phase,
neutralisation of the latter by a neutralising calcium compound with precipitation of said calcium monohydrogen phosphate in an aqueous solution, and
isolation of the precipitated calcium monohydrogen phosphate from said aqueous solution, and
digesting the isolated calcium monohydrogen phosphate in an aqueous medium by sulphuric acid under conditions giving rise to the formation of a first slurry of calcium sulphate dihydrate crystals suspended in an acidic aqueous phase having a content of free $P_2O_5$.

According to the invention, the digestion is carried out in order to obtain, in the first slurry, a content of free $SO_3$ equal to or less than 1.5% by weight of the first slurry, and the method further comprises:
converting at least part of said first slurry by heating to a temperature greater than 80° C. and potentially by adding sulphuric acid, whereby solubilisation of the calcium sulphate dihydrate crystals and recrystallisation of the solubilised calcium sulphate produce a second slurry of α-calcium sulphate hemihydrate crystals suspended in an aqueous phase based on phosphoric acid, in which the content of free $SO_3$ is less than 10% by weight, preferably less than 8% by weight, in particular less than 5% by weight of the first slurry, and
separating, in said second slurry, between the aqueous phase based on phosphoric acid and a filter cake based on α-calcium sulphate hemihydrate-.

This method has the advantage of simultaneously proceeding to the sulphuric digesting step on a phosphate material from which many impurities have already been removed, and obtaining an efficient $P_2O_5$ extraction yield. Indeed, during the conversion, the $P_2O_5$ co-crystallised in the gypsum crystals is recovered, which produces a calcium sulphate having a content of P2O5 less than 0.6% by weight of. The conversion conditions are such that the final product sought, an α-calcium sulphate hemihydrate, is obtained. This no longer requires subsequent purification.

Advantageously, this method further comprises a step of drying and grinding the separated α-calcium sulphate hemihydrate. After drying and grinding to the required particle size, it can then be directly used by plasterers.

The phosphate source used in the method according to the invention can be any material containing a substantial content of $P_2O_5$, for example a phosphate ore, a phosphate rock, ashes, wastewater treatment plant sludge, bones, pig manure, mixtures thereof and similar materials.

The acid to be used for attacking the phosphate source in an aqueous medium can be the phosphoric acid, hydrochloric acid, nitric acid, sulphuric acid, or mixtures thereof. The separated solid phase from the pulp contains a high number of metal impurities, in particular heavy metals, radioactive elements or insoluble inert materials. The separated aqueous phase from the pulp contains water-soluble calcium phosphate, i.e. calcium dihydrogen phosphate (MCP or monocalcium phosphate), as well as soluble salts that depend on the used acids, for example calcium chloride, calcium nitrate, and similar products.

The neutralising calcium compound used to neutralise the aqueous phase containing the water-soluble calcium phosphate is advantageously quick lime or slaked lime, calcium carbonate or other calcium salt having a neutralising effect. The neutralisation is advantageously performed at a pH chosen such that the calcium monohydrogen phosphate precipitates, while the salts of the one or more applied acids remain in a solution. Advantageously, this pH is about 2.5 to 4.

The α-calcium sulphate hemihydrate obtained in the final filter cake contains an impregnation water of about 10 to 25% by weight. The hemihydrate must therefore advantageously be directly dried so as to prevent any rehydration into a dihydrate form. Advantageously, the α-calcium sulphate has a crystallisation water content between 6.2% and 1.5% by weight of after drying. Preferably, the water content of the calcium sulphate hemihydrate obtained after drying is 6.2%.

The grinding of the α-calcium sulphate hemihydrate thus dried is performed depending on the properties of setting speed or mechanical strength desired by the user. The grinding and the drying can take place simultaneously or separately. If the α-calcium sulphate hemihydrate product has a residual acidity, it is desirable to neutralise it, in particular by adding a neutralising agent, such as the oxide, the hydroxide or the calcium carbonate, or mixtures thereof. Additives required to manufacture plaster can also be added to this calcium sulphate.

According to the invention, the digestion is performed under conditions resulting in the formation of gypsum in the first slurry. According to these conditions, the first slurry having a content of free $SO_3$ equal to or less than 1.5% by weight, which is an advantageously low content.

According to one specific embodiment of the invention, the digestion by sulphuric acid is performed at a temperature of greater than 65° C. and less than 75° C., preferably at about 70° C., at a content of free $P_2O_5$ in the acidic aqueous phase of 30-38% by weight of the first slurry and at a content of free $SO_3$ in said acidic aqueous phase of more than 0.5% by weight of the first slurry, preferably comprising between 0.8 and 1.2% by weight, advantageously about 1% by weight. Under these conditions, the calcium sulphate obtained is formed from gypsum, which is crystallised by encapsulating simultaneously the $P_2O_5$ values that are unacceptable for plasterers. This $P_2O_5$ is released during the conversion step, where the gypsum is solubilised, and the hemihydrate crystallised in the second slurry can thus has a content of $P_2O_5$ less than 0.6% by weight.

In such an embodiment, the method can further comprise, before said conversion, the steps of:
dividing the first slurry into a first fraction and a second fraction, and
filtering the first fraction with separation, as a filtrate, of production phosphoric acid and, as a filter cake, of calcium sulphate dihydrate, which is mixed with said second fraction to be subjected to said conversion.
said conversion being performed at a temperature from 85 to 90° C., with added sulphuric acid, in order to obtain, in the aqueous phase based on phosphoric acid of the second slurry, a content of free $SO_3$ of greater than 2% by weight of the second slurry, preferably between 5 and 6.5% by weight.

This embodiment therefore includes a filtration step after each of the digestion and conversion steps. The gypsum forming the cake of the first filtration is introduced into the fraction of the unfiltered slurry which subjected to the conversion and thus all of the calcium sulphate separated during this process is in the form of a pure α-calcium sulphate hemihydrate and can be immediately used by plasterers, preferably after a simple drying and a grinding at the sought grain size. On the other hand, the phosphoric acid filtered during the first filtration step is a high-quality production acid. Preferably, the aqueous phase based on phosphoric acid separated from the filter cake based on α-calcium sulphate hemihydrate is recycled during the aforementioned digestion step. It consists of a mixture of phosphoric acid and sulphuric acid that are perfectly suited for use in the digestion step.

According to one particularly advantageous embodiment of the invention, the digestion is performed at a temperature between 70° C. and 90° C., at a content of free $P_2O_5$ in the acidic aqueous phase of 38 to 50% by weight of the first slurry and at a content of free $SO_3$ in the acidic aqueous phase of less than 0.5% by weight and more than 0.05% by weight of the first slurry. Under these conditions of temperature and $P_2O_5$ concentration conditions, a hemihydrate should normally be obtained. Advantageously, by adding sulphuric acid during digestion in near stoichiometric proportions, calcium sulphate dihydrate is obtained again.

Preferably, in this last embodiment, the conversion in performed for all of said first slurry at a temperature equal to or greater than 90° C., so as to obtain, in the aqueous phase based on phosphoric acid—of the second slurry, a content of free $P_2O_5$ of 35 to 45% by weight and a content of free $SO_3$ of less than 2% by weight, preferably less than 1.0% by weight, and greater than 0.1% by weight, in relation to the weight of the second slurry, the aqueous phase based on phosphoric acid—being, after said separation, a production phosphoric acid. The cake from the unique filtration step succeeding the conversion step is a very pure α-calcium sulphate hemihydrate that can be used directly, in particular after drying and grinding to the desired grain size.

It should be noted that, in this embodiment, a very small quantity of sulphuric acid can be added during the conversion. It is also possible that the conversion step does not include such an addition. In any case, the consumption of sulphuric acid in this embodiment of the method according to the invention is particularly low.

In some applications, the method according to the invention can also be considered to further comprise maturing the separated α-calcium sulphate hemihydrate so as to produce a β-calcium sulphate dihydrate. The α-calcium sulphate hemihydrate stockpiled is gradually rehydrated and the β-gypsum thus obtained can then be dried.

Other details and features of the invention can be obtained from the accompanying claims.

The method according to the invention will now be described in a more detailed manner, with reference to the accompanying figures.

In the different figures, identical or similar elements keep the same reference numerals.

Figures 1, 2:
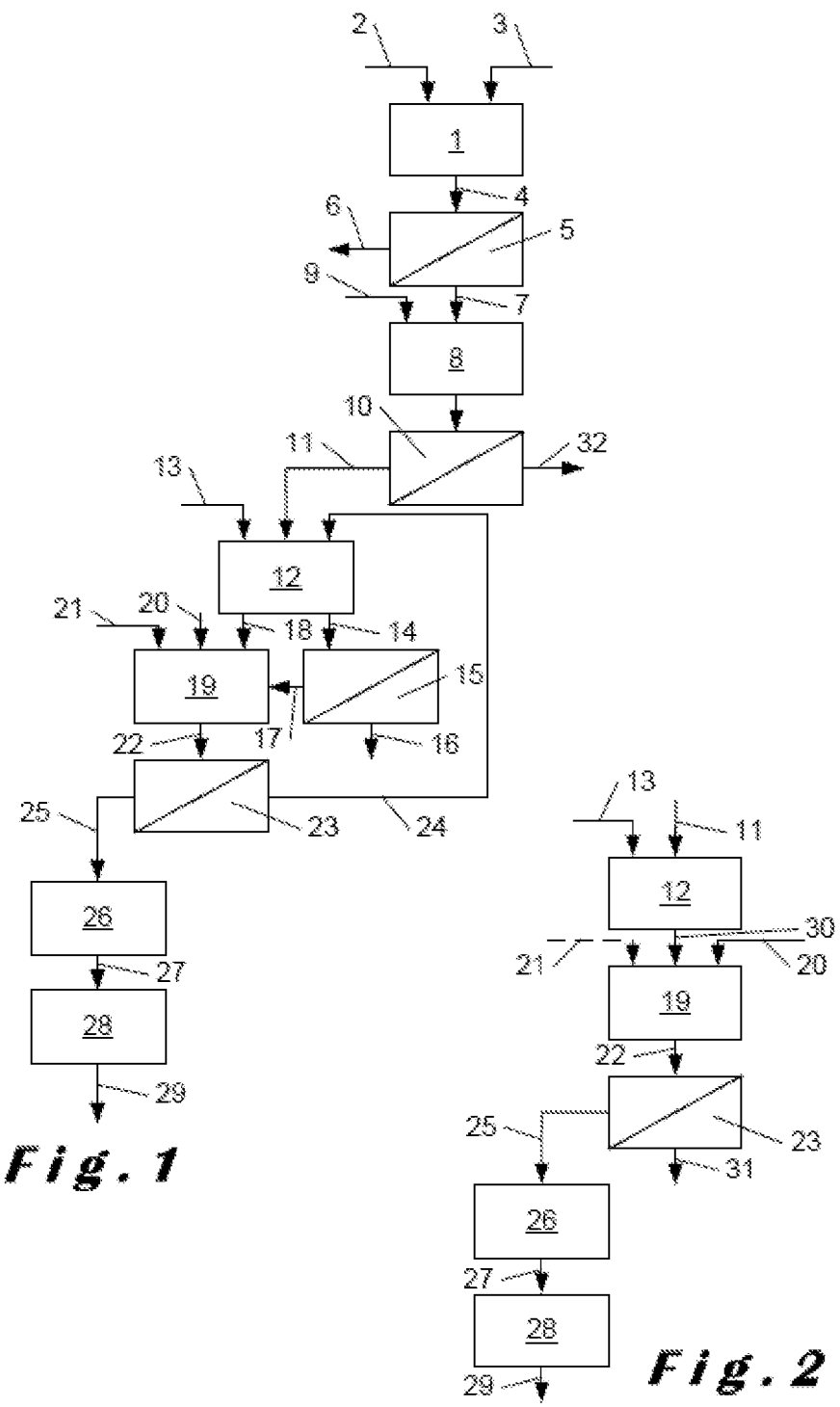
FIG. 1 shows, in the form of a flow diagram, an installation example implementing one embodiment of the method according to the invention.
FIG. 2 shows, in the same manner, an installation example implementing another embodiment of the method according to the invention.

The installation shown in FIG. 1 comprises an attack reactor 1 into which is introduced in 2 the crushed phosphate rock and in 3 a strong acid, for example hydrochloric acid. The following conditions are applied in this reactor:

Temperature: 50-70° C.
Residence time: <1 hour

The pulp 4 obtained in the reactor 1 is formed from an aqueous phase, in which calcium dihydrogen phosphate (MCP) and calcium chloride are dissolved, and a solid phase containing metallic impurities and radioactive elements present in the rock. These two phases are separated in a filtration device 5. The impurities are discarded in 6, whereas the aqueous phase 7 is neutralised in a tank 8 by the addition therein of a basic agent 9, for example calcium carbonate. This addition is controlled so as to increase the pH to reach a value preferably between 2.5 and 3.0. The calcium monohydrogen phosphate (DCP) is therefore precipitated, whereas other salts, such as calcium chloride, remain in the dissolved state. The suspension obtained is then transferred to a filtration device 10, which is used to isolate, in solid form, the calcium monohydrogen phosphate 11 from an aqueous solution of calcium chloride 32, which is discarded to be used in other treatments or for recycling.

The calcium monohydrogen phosphate is then added inside a digestion reactor 12, where it is subjected to the action of the sulphuric acid added in 13, for example sulphuric acid at a concentration of 98-99% by weight. This reaction is exothermic and does not require the calorie intake, but merely a thermic adjustment of the reactor by known means.

The following operating conditions are applied in this reactor:

Temperature: >65-<75° C., preferably 70° C.
% free $P_2O_5$: 30-38% by weight
% free $SO_3$: >0.5%-1.5% by weight, preferably 0.8-1.2%, in particular 1.0% by weight.
Residence time: 2-4 hr, preferably 3 hr.

Under these conditions, a gypsum slurry is formed in an acidic aqueous phase having a significant content of free $P_2O_5$. A first fraction 14 of this slurry is transferred to a filtration device 15. The filtrate 16 obtained is a high-quality production phosphoric acid and the filter cake 17 formed from gypsum is transported, as the second fraction 18 of the slurry from the digestion, to a conversion tank 19. The temperature is increased in this tank in a known manner, for example by adding water vapour in 20, and a small additional quantity of sulphuric acid is added to the reaction medium in 21.

The following operating conditions are applied in the conversion tank:

Temperature: >80° C., preferably 85-90° C.
% free $P_2O_5$: 24-32% by weight
% free $SO_3$: 2-10% by weight, preferably 5-8.0% by weight
Residence time: 45 to 90 min., preferably 60 min.

Under these conditions, the calcium sulphate dihydrate is solubilised, releases the $P_2O_5$ values that it contains and is recrystallised in the form of a particularly pure and easily filterable α-calcium sulphate hemihydrate which has only an extremely low content of $P_2O_5$.

The second slurry thus formed 22 is then transferred to a filtration device 23. The filtrate 24, formed from a mixture of phosphoric acid and sulphuric acid, can be recycled in the digestion reactor 12. The filter cake formed from α-calcium sulphate hemihydrate that is still impregnated with water can be immediately transferred in 25 to a drying device 26, where it is dried so that it advantageously contains no more than 6.2% of crystallisation water, which prevents it from becoming rehydrated. The dried hemihydrate is then conveyed in 27 to a grinding device 28 (for example a cutter mill), from which the ground product to the desired grain size can be transferred in 29 to applications where it can be directly implemented, eventually with different suitable additives, to manufacture products with particularly developed mechanical properties.

Advantageously, the drying step 26 and the grinding step 28 can simultaneously be realised in a dryer mill; in this case, no conveyor device 27 is required.

It must be understood that this method, which is represented as done in one process, may be subject to intermediate proceeding. For example, the isolated DCP can be stored before being used in the digestion.

FIG. 2 shows a method according to the invention which, after isolation of the DCP, takes place in an alternative manner. The part of the method preceding the digestion reactor 12 can therefore be taken from FIG. 1.

In this example embodiment, the operating conditions in the digestion reactor 12 are the following:
Temperature: 70-90° C., preferably 70-80° C.
% free $P_2O_5$: 38-50% by weight
% free $SO_3$: 0.05%-<0.5% by weight
Residence time: 2-4 hr.

The gypsum slurry surprisingly formed under these conditions is not filtered and is transferred in its entirety in 30 to the conversion tank 19.

It is heated, for example by water vapour, in 20 and a small quantity of sulphuric acid is potentially added, however not absolutely necessary, in 21. The operating conditions in the conversion tank 19 are following:
Temperature: >90° C., preferably 90-105° C.
% free $P_2O_5$: 35%-45% by weight
% free $SO_3$: <2% by weight, preferably 0.1-<1.0% by weight
Residence time: 0.5-1.5 hr.

A second slurry 22 of α-calcium sulphate hemihydrate is thus obtained, which is then transferred into a filtration device 23. The filtrate 31 is a very high quality phosphoric acid, containing a high content of $P_2O_5$, which is the production acid. The filter cake 25 impregnated with water is, as in the first example embodiment, dried then ground to produce the α-calcium sulphate hemihydrate ready for use.

EXAMPLE

α-calcium sulphate hemihydrate has been prepared under the operating conditions of the method shown in FIG. 1.

A chemical analysis of the two dry samples has been performed, and is summarised in Table 1 below:

TABLE 1

| Analyses at 250° C. | Sample 1 | Sample 2 |
|---|---|---|
| $P_2O_5$, % | 0.18 | 0.19 |
| CaO, % | 41.48 | 41.16 |
| $Al_2O_3$, % | 0.0364 | 0.0763 |
| F, % | 0.1188 | 0.0626 |
| $SiO_2$, % | 0.1550 | 0.1575 |
| $Fe_2O_3$, % | 0.0189 | 0.0187 |
| MgO, % | <0.0050 | <0.0050 |
| $Na_2O$, % | 0.0406 | 0.0468 |
| $K_2O$, % | 0.0563 | 0.1006 |
| Th, ppm | <6.1500 | <6.2500 |
| Sr, % | 0.0332 | 0.0525 |
| Ti, ppm | 22.5092 | 41.0467 |
| $U_3O_8$, ppm | 12.6691 | <1.250 |
| Cd, ppm | <0.615 | <0.625 |
| As, ppm | 3.5670 | 0.3044 |
| Pb, ppm | 148.4894 | 160.0000 |
| Hg, ppm | <0.123 | <0.125 |
| Total C, ppm | 84.8708 | 85.0000 |

This table shows that the α-calcium sulphate hemihydrate produced is particularly pure, in particular suitable for use by plasterers.

As shown, this calcium sulphate hemihydrate contains an extremely low content of $P_2O_5$, which is a key requirement for plasterers. Indeed, the $P_2O_5$ is an element that interferes with the setting time of cements and plasters.

On the other hand, a residual content of $Na_2O$ is shown to be greatly below 1,500 ppm, even below 500 ppm, which is particularly advantageous for a use of calcium sulphate in plasterboard. Indeed, the $Na_2O$ has the drawback of causing a efflorescence of calcium sulphate after installation.

Flexural strength tests have been then conducted according to the following protocol:

The samples of the hemihydrate analysed above have been rehydrated in view of the plaster preparation (water/calcium sulphate ratio ~0.34). The plaster thus formed was poured into rectangular parallelepipedal moulds (3.9×3.9×16.2 cm). Once solidified, the plaster test pieces were removed from the moulds and subjected to a flexural strength test. Each bar-shaped test piece was placed on three bearing points and stress was applied to the central point. The stress was gradually increased until the test piece fractured.

These flexural strength tests have been conducted after different periods of time after solidification and demoulding.

TABLE 2

| | Time after demoulding (days) | | |
|---|---|---|---|
| | 1 | 7 | 21 |
| Flexural strength (MPa) | 4.81 | 6.08 | 6.37 |

These results therefore show a calcium sulphate hemihydrate having a flexural strength of more than 2.5 MPa, advantageously more than 4 MPa.

In compressive strength tests, the samples also showed a strength of more than 5 MPa, advantageously of more than 10 MPa.

It must be understood that this invention is in no way limited to the example embodiment disclosed hereinabove and that numerous modifications can be made without leaving the scope of the appended claims.

The invention claimed is:

1. A method for preparing calcium sulphate comprising the steps of:
producing calcium monohydrogen phosphate by:
attack in an aqueous medium of a source of phosphate by an acid with the formation of a pulp comprising an aqueous phase containing water-soluble calcium phosphate and a solid phase containing impurities,
separation of the aqueous phase,
neutralization of the latter by a neutralizing calcium compound with precipitation of said calcium monohydrogen phosphate in an aqueous solution, and
isolation of the precipitated calcium monohydrogen phosphate from said aqueous solution, and
digesting the isolated calcium monohydrogen phosphate in an aqueous medium by sulphuric acid under conditions giving rise to the formation of a first slurry of calcium sulphate dihydrate crystals suspended in an acidic aqueous phase having a content of free $P_2O_5$,
wherein digestion is carried out at a temperature greater than 65° C. and less than 75° C., at a content of free $P_2O_5$ in the acidic aqueous phase of 30-38% by weight of the first slurry and at a content of free $SO_3$ in said acidic aqueous phase greater than 0.5% by weight of the first slurry and in order to obtain, in the first slurry, a content of free $SO_3$ equal to or less than 1.5% by weight of the first slurry, and in that the method further comprises the steps of:

converting at least part of said first slurry by heating to a temperature greater than 80 C and optionally adding sulphuric acid, wherein solubilisation of the calcium sulphate dihydrate crystals and recrystallisation of the solubilised calcium sulphate give rise to a second slurry of α-calcium sulphate hemihydrate crystals suspended in an aqueous phase based on phosphoric acid, wherein the content of a free $SO_3$ is less than 10% by weight of the second slurry, and separating, in said second slurry, the aqueous phase based on phosphoric acid and a filter cake based on α-calcium sulphate hemihydrate.

2. The method for preparing calcium sulphate according to claim 1, further comprising a step of drying and grinding of the separated α-calcium sulphate hemihydrate.

3. The method according to claim 2, wherein the dried α-calcium sulphate hemihydrate has a crystallization water content between 6.2% and 1.5% by weight.

4. The method according to claim 3, wherein the separated α-calcium sulphate hemihydrate has a residual acidity, and the method further comprises a neutralisation of said residual acidity.

5. The method according to claim 2, wherein the grinding and the drying of the separated α-calcium sulphate hemihydrate take place simultaneously or separately.

6. The method according to claim 1, wherein the content of free $SO_3$ in the aqueous phase based on phosphoric acid of the conversion step is less than 8% by weight of the second slurry.

7. The method according to claim 1, wherein the source of phosphate is a phosphate ore, a phosphate rock, ashes, wastewater treatment plant sludge, bones, pig manure, or a mixture thereof.

8. The method according to claim 1, further comprising, before said conversion, the steps of:

dividing the first slurry into a first fraction and a second fraction, and filtering the first fraction with separation, as a filtrate, of production phosphoric acid and, as a filter cake, of calcium sulphate dihydrate, which is mixed with said second fraction to be submitted to said conversion, and wherein said conversion is performed at a temperature from 85 to 90° C., with added sulphuric acid, in order to obtain, in the aqueous phase based on phosphoric acid of the second slurry, a content of free $SO_3$ greater than 2% by weight of the second slurry.

9. The method according to claim 1, wherein said aqueous phase based on phosphoric acid separated from the filter cake based on α-calcium sulphate hemihydrate is recycled during the aforementioned digestion step.

10. The method according to claim 1, wherein the digestion is performed at a temperature between 70° C. and 90° C., at a content of free $P_2O_5$ in the acidic aqueous phase of 38 to 50% by weight of the first slurry and at a content of free $SO_3$ in the acidic aqueous phase of less than 0.5% by weight and greater than 0.05% by weight of the first slurry.

11. The method according to claim 10, wherein the conversion is performed for all of said first slurry at a temperature equal to or greater than 90° C., so as to obtain, in the aqueous phase based on phosphoric acid of the second slurry, a content of free $P_2O_5$ of 35 to 45% by weight and a content of free $SO_3$ concentration of less than 2% by weight in relation to the weight of the second slurry, the aqueous phase based on phosphoric acid being, after said separation, a production phosphoric acid.

12. The method according to claim 11, wherein the conversion step does not comprise the addition of sulphuric acid.

13. The method according to claim 1, further comprising maturing the separated α-calcium sulphate hemihydrate in order to provide a β-calcium sulphate dihydrate.

14. The method according to claim 1, wherein the digestion and the conversion take place in the separated reactors.

15. The method according to claim 1, wherein the content of free $SO_3$ in the aqueous phase based on phosphoric acid of the conversion step is less than 5% by weight of the second slurry.

* * * * *